United States Patent
Hamada et al.

(10) Patent No.: US 9,292,761 B2
(45) Date of Patent: Mar. 22, 2016

(54) IMAGE PROCESSING DEVICE, IMAGE PROCESSING METHOD, AND PROGRAM

(71) Applicant: SONY CORPORATION, Tokyo (JP)

(72) Inventors: Takehiro Hamada, Kanagawa (JP); Hidetoshi Nagano, Kanagawa (JP); Hironori Hattori, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 139 days.

(21) Appl. No.: 14/105,499

(22) Filed: Dec. 13, 2013

(65) Prior Publication Data

US 2014/0177965 A1  Jun. 26, 2014

(30) Foreign Application Priority Data

Dec. 20, 2012 (JP) ................. 2012-278676

(51) Int. Cl.
| | |
|---|---|
| *G06K 9/66* | (2006.01) |
| *G06K 9/46* | (2006.01) |
| *G06T 7/00* | (2006.01) |
| *G06T 11/00* | (2006.01) |
| *G06K 9/62* | (2006.01) |

(52) U.S. Cl.
CPC ................ *G06K 9/46* (2013.01); *G06K 9/6282* (2013.01); *G06T 7/0044* (2013.01); *G06T 11/00* (2013.01); *G06K 9/4609* (2013.01); *G06T 2207/30204* (2013.01)

(58) Field of Classification Search
USPC .......... 382/171, 190, 192, 282; 358/538, 540, 358/453
See application file for complete search history.

(56) References Cited

U.S. PATENT DOCUMENTS

| | | | | |
|---|---|---|---|---|
| 6,817,982 | B2 * | 11/2004 | Fritz .................... | A61B 8/0858 382/128 |
| 7,110,591 | B2 * | 9/2006 | Neubauer et al. ............. | 382/147 |
| 7,127,090 | B2 * | 10/2006 | Kreang-Arekul ........ | G06K 9/32 382/128 |
| 7,353,994 | B2 * | 4/2008 | Farrall ..................... | G06K 7/12 235/454 |
| 7,391,895 | B2 * | 6/2008 | Wang et al. ................... | 382/132 |
| 7,564,999 | B2 * | 7/2009 | Luo .............................. | 382/128 |
| 7,796,243 | B2 * | 9/2010 | Choo-Smith ........ | A61B 5/0066 356/72 |
| 7,804,993 | B2 * | 9/2010 | Dorphan ............ | G01N 21/9501 382/141 |
| 7,899,623 | B2 * | 3/2011 | Marcelpoil et al. ............. | 702/19 |
| 8,391,574 | B2 * | 3/2013 | Collins et al. ................. | 382/128 |
| 8,605,990 | B2 * | 12/2013 | Izumi ............................ | 382/154 |

FOREIGN PATENT DOCUMENTS

JP    4868186    11/2011

* cited by examiner

*Primary Examiner* — Yosef Kassa
(74) *Attorney, Agent, or Firm* — Frommer Lawrence & Haug LLP; William S. Frommer

(57) ABSTRACT

There is provided an image processing device including a feature point extraction unit that extracts feature points from an input image, a feature amount calculation unit that calculates feature amounts of the feature points, an image processing unit that processes the marker image to transform the feature amounts of non-distinguishing feature points into feature amounts of distinguishing feature points when the feature points extracted from a marker image included in the input image are not distinguishing, and a marker image generation unit that generates a new marker image based on the processing result.

10 Claims, 12 Drawing Sheets

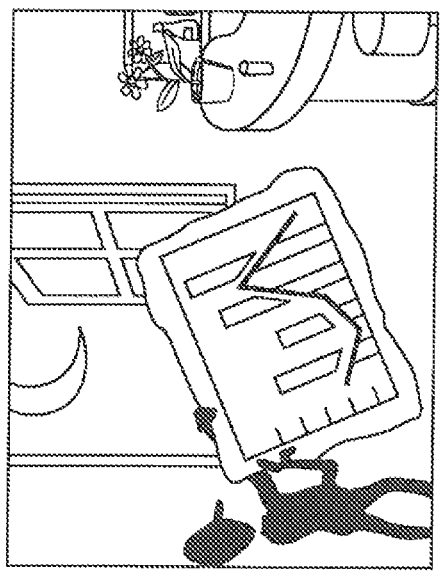
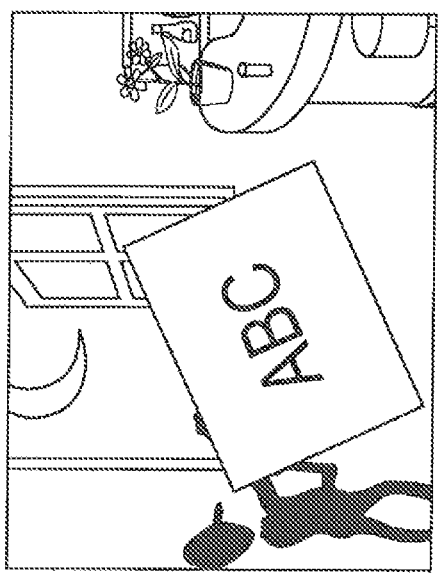
FIG. 1

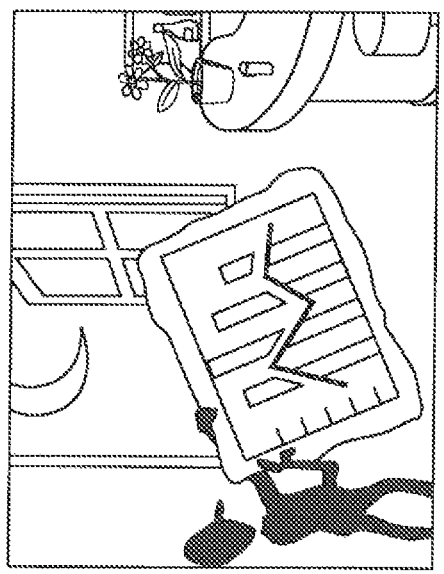
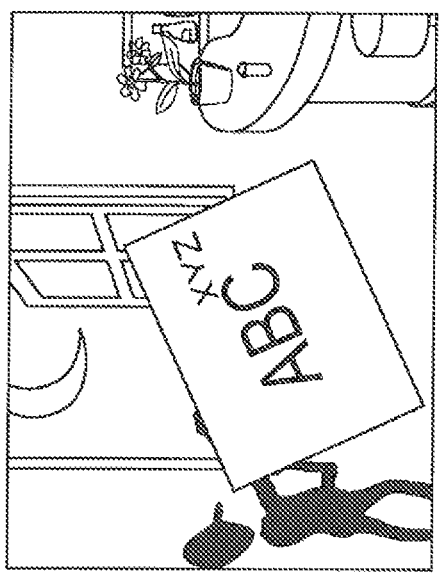
FIG. 13

IMAGE PROCESSING DEVICE, IMAGE PROCESSING METHOD, AND PROGRAM

CROSS REFERENCE TO RELATED APPLICATIONS

This application claims the benefit of Japanese Priority Patent Application JP 2012-278676 filed Dec. 20, 2012, the entire contents of which are incorporated herein by reference.

BACKGROUND

The present technology relates to an image processing device, an image processing method, and a program, and more particularly, to an image processing device, an image processing method, and a program capable of calculating the position or posture of a marker for which an original state is reserved with high accuracy.

Technologies for analyzing a captured image obtained by photographing a known 2-dimensional plane (hereinafter referred to as a "marker"), estimating the position or posture of the marker on the image, and calculating a relative position or posture of the marker relative to a camera have been known.

As application programs using the technologies, application programs estimating a marker image registered in advance in an authentication system from a captured image and substituting the marker image with a separate image (superimposition image) by image combining are assumed.

Specifically, as illustrated in FIG. 1, an example of the technology is a technology for photographing a captured image including a fillip on which the name of a company, "ABC," is recorded using a camera, estimating the position or direction of a marker included in the captured image, substituting the marker image with a superimposition image such as a graph, and outputting the superimposition image to a monitor.

In order to substitute the marker image with a separate image, it is necessary to accurately detect the position or direction of the marker. When a camera is moved or rotated or when a marker is moved or rotated, it is necessary to track the motion of the camera or the marker, change the position or direction of the substituted image, and combine the superimposition image.

When a video or computer graphics (CG) is assumed to be combined in correspondence with the position or posture of the marker, it is necessary to maintain geometric consistency. For this reason, calculating the position or posture of the marker with high accuracy is an important technology.

In general, the above-mentioned prerequisite can be achieved by installing a sensor, which detects the position or direction of the marker to take a photograph, other than a camera. However, it is difficult to provide such a system at a low cost. For this reason, methods of estimating the position or posture of a marker by performing an image recognition process on a captured image photographed by a camera have been suggested.

As the methods of calculating the position or posture of this marker with high accuracy, there are methods of generating a marker image which is easy to estimate according to a marker recognition method.

For example, a technology for extracting an image feature of a background image in advance, creating a distinguishing feature different from the image feature, and generating a marker image that has the distinguishing feature has been disclosed (for example, see Japanese Patent No. 4868186). According to this technology, it is easy to distinguish the image feature of the background from the image feature of the marker image, and thus it is easy to estimate the position or posture of the marker.

SUMMARY

The technology disclosed in Japanese Patent No. 4868186 is a technology for estimating the position of a marker. However, when the technology is applied, the posture of the marker can be estimated. Specifically, a plurality of feature points on a marker image may be disposed and a marker image may be generated so that the image feature of each point is distinguishing.

In this case, however, since the marker image is generated from the beginning, an image, a character, or the like desired by a user may not be included in the marker image. For this reason, there is a demand for calculating the position or posture of the marker including a desired image or characters with high accuracy.

It is desirable to provide a technology for calculating the position or posture of a marker for which an original state is reserved with high accuracy.

According to an embodiment of the present technology, there is provided an image processing device including a feature point extraction unit that extracts feature points from an input image, a feature amount calculation unit that calculates feature amounts of the feature points, an image processing unit that processes the marker image to transform the feature amounts of non-distinguishing feature points into feature amounts of distinguishing feature points when the feature points extracted from a marker image included in the input image are not distinguishing, and a marker image generation unit that generates a new marker image based on the processing result.

The image processing unit may process the marker image so that a value of the feature amount of a feature point of interest which is a feature point in which interest is taken does not approximate values of the feature amounts of the feature points near the feature point of interest.

The image processing device may further include a feature point generation unit that generates feature points to be added to the processed marker image and adds the generated feature points to the processed marker image.

The feature point generation unit may add the feature points so that a bias is eliminated in a distribution of the feature points when there is the bias in the distribution of the feature points on the marker image.

The feature point generation unit may add the feature points so that a number of the feature points increases when the number of the feature points on the marker image is less than a predetermined threshold value.

The image processing unit may process the marker image so that an evaluation function that has a term for evaluating preservation of the input image and a term for evaluating loose condition of the feature amounts of the feature points is minimized.

The feature amount calculation unit may calculate the feature amounts in consideration of robustness of information regarding the marker image or without consideration of the robustness of the information regarding the marker image.

The image processing device may further include a recognition unit that recognizes a new marker image used for image combining and included in the input image, and an image combining unit that combines a predetermined superimposition image on the recognized marker image.

The image processing unit may correct a luminance value of a pixel corresponding to the non-distinguishing feature point.

The image processing device according to an embodiment of the present technology may be an independent device or may be an internal block included in one device.

The image processing method or the program according to an embodiment of the present technology is an image processing method or program corresponding to the above-described image processing device according to an embodiment of the present technology.

In an image processing device, an image processing method, and a program according to an embodiment of the present technology, feature points are extracted from an input image; feature amounts of the feature points are calculated; the marker image is processed to transform the feature amounts of non-distinguishing feature points into feature amounts of distinguishing feature points when the feature points extracted from a marker image included in the input image are not distinguishing; and a new marker image is generated based on the processing result.

According to an embodiment of the present technology, it is possible to calculate the position or posture of the marker for which the original state is reserved with high accuracy.

BRIEF DESCRIPTION OF THE DRAWINGS

FIG. 1 is a diagram illustrating image combining;

FIG. 13 is a diagram illustrating a specific method of generating the combined image.

DETAILED DESCRIPTION OF THE EMBODIMENTS

Figure 2:
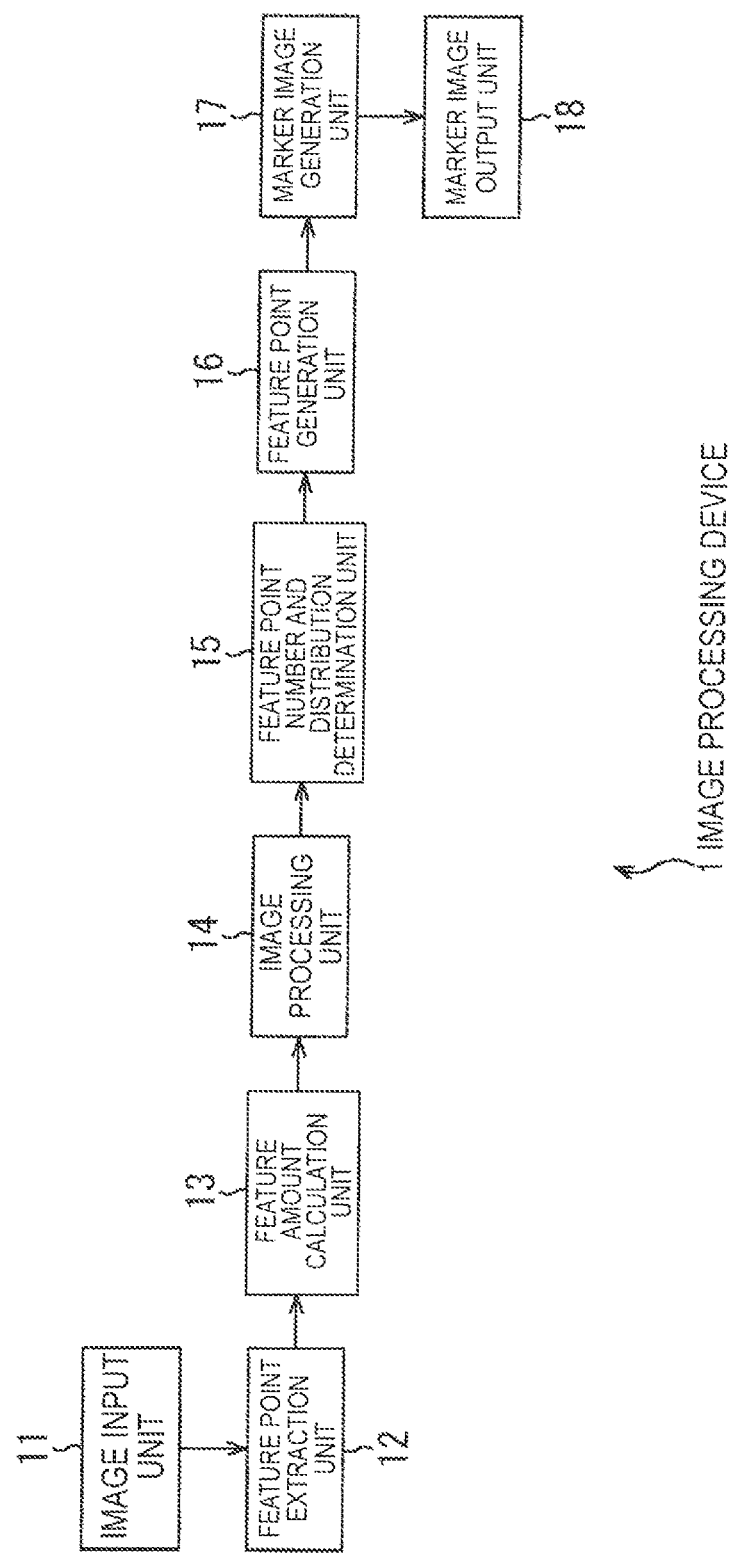
FIG. 2 is a diagram illustrating an embodiment of the configuration of an image processing device to which the present technology is applied.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments of the present technology will be described with reference to the drawings.

<First Embodiment>
<Example of Configuration of Image Processing Device>

FIG. 2 is a diagram illustrating an embodiment of the configuration of an image processing device to which the present technology is applied.

As illustrated in FIG. 2, an image processing device 1 includes an image input unit 11, a feature point extraction unit 12, a feature amount calculation unit 13, an image processing unit 14, a feature point number and distribution determination unit 15, a feature point generation unit 16, a marker image generation unit 17, and a marker image output unit 18.

The image input unit 11 acquires an input image input from an external device and supplies the input image to the feature point extraction unit 12. For example, the input image is input to a camera, a recording medium, a server, or the like connected via a network.

The feature point extraction unit 12 extracts feature points included in the input image supplied from the image input unit 11 and supplies the feature points to the feature amount calculation unit 13.

Here, feature points are extracted using, for example, a Harris Corner Detector. However, various methods have been suggested as the feature point extraction method, and thus any method can be used.

The feature amount calculation unit 13 calculates a feature amount of each feature point included in the input image supplied from the feature point extraction unit 12 and supplies the feature amount of each feature point to the image processing unit 14.

Here, for example, the feature points are calculated using Random Ferns. The details of Random Ferns are recorded in the following document 1.

Document 1: "Fast KeyPoint Recognition Using Random Ferns" by Mustafa Ozuysal, Michael Calonder, Vincent Lepetit, and Pascal Fua, in IEEE Transactions on Pattern Analysis and Machine Intelligence, Jan. 15, 2009

When the feature points extracted from a marker image included in the input image are not distinguishing based on the feature amount of each feature point supplied from the feature amount calculation unit 13, the image processing unit 14 processes the marker image to transform the feature amount of non-distinguishing feature points into feature amounts of distinguishing feature points. Specifically, the marker image is processed such that the feature points having similar feature amounts are not near each feature point.

The processed marker image is supplied to the feature point number and distribution determination unit 15.

The feature point number and distribution determination unit 15 determines whether a feature point is further added to the processed marker image supplied from the image processing unit 14 and supplies the determination result to the feature point generation unit 16. In the determination process, for example, it is determined whether there is a bias in the distribution of the feature points on the marker image or the number of feature points on the marker image is equal to or greater than a predetermined threshold value.

When there is the bias in the distribution of the feature points on the marker image according to the determination result supplied from the feature point number and distribution determination unit 15, the feature point generation unit 16 generates the feature points and adds the feature points to the processed marker image so that the bias is eliminated in the distribution of the feature points.

When the number of feature points on the marker image is less than the predetermined threshold value according to the determination result supplied from the feature point number and distribution determination unit 15, the feature point generation unit 16 generates the feature points and adds the feature points to the processed marker image so that the number of feature points increases.

By adding the feature points, the marker image is further processed. The processed marker image is supplied to the marker image generation unit 17. However, when the feature point number and distribution determination unit 15 determines that the feature points are not added, the feature point generation unit 16 supplies the marker image generation unit 17 with the processed marker image to which the feature points are not added without change.

The marker image generation unit 17 generates a new marker image based on the processed marker image supplied from the feature point generation unit 16 and supplies the new marker image to the marker image output unit 18.

The marker image output unit 18 outputs the new marker image supplied from the marker image generation unit 17 to an external device.

The image processing device 1 has the above-described configuration.

<First Marker Generation Process>

Next, a first marker generation process performed by the image processing device 1 in FIG. 2 will be described with reference to the flowchart of FIG. 3.

In step S1, the feature point extraction unit 12 performs a feature point extraction process on an input image acquired by the image input unit 11 using a Harris Corner Detector to extract feature points from the input image. Through the feature point extraction process, 2-dimensional coordinates of corner points which are intersection points of the edges in the input image are calculated.

In step S2, the feature amount calculation unit 13 performs the feature amount calculation process on each feature point extracted by the feature point extraction unit 12 using Random Ferns to calculate a feature amount.

In Random Ferns, by generating a plurality of images in which geometric transform or noise is added to the input image and calculating feature amounts by performing an image analysis process, it is possible to obtain the feature amounts which can be subjected to robust recognition against a direction or noise of a marker. On the other hand, a probability of false recognition is known to increase as robustness increases. For this reason, it is effective to properly use presence or absence of the robustness in each application program according to a scene or to concurrently use a feature amount in consideration of the robustness and a feature amount without consideration of the robustness, rather than simply considering the robustness.

Accordingly, in the first embodiment, a case in which the robustness against the direction or noise of the marker is not considered will be described. In a second embodiment to be described below, a case in which the robustness against the direction or noise of the marker is considered will be described.

In Random Ferns in which the robustness is not considered in the first embodiment, a bit string can be obtained as a feature amount by describing a magnitude relation between two points selected at random in a periphery of a pixel of interest, which is a pixel in which interest is taken among pixels constituting an input image, by binary (0, 1) and performing this operation a plurality of times. That is, a corresponding feature amount $f_i$ can be obtained for a given feature amount $p_i$. Here, the feature point $p_i$ is a vector representing coordinate values on an image. The feature amount $f_i$ is a vector of binary values in which the result of each operation described above is obtained as a component. For example, the feature amount $f_i$ has a value of "$f_i=[011010 \ldots 1]^T$." Here, T indicates transposition of the vector. Further, i indicates an index of the feature amount. When n is assumed to be the number of feature amounts included in an image, $i=0, 1, \ldots,$ and $n-1$.

When the feature amount of each feature point on the input image is calculated in the process of step S2, the process proceeds to step S3.

In step S3, the image processing unit 14 performs first image processing.

In the first image processing, the marker image is processed so that feature points having similar feature amounts are near each feature point extracted from the marker image included in the input image. Accordingly, non-distinguishing feature points are processed among the feature points on the marker image and the feature amounts of the non-distinguishing feature points are transformed into feature amounts of distinguishing feature points.

That is, in the first image processing, in order to eliminate a combination in which a distance is close in a feature space between the feature amounts, the marker image is processed so that the value of the feature amount of the feature point of interest does not approximate the values of the feature amounts of the feature points near the feature point of interest.

This is caused by a process (hereinafter referred to as a "marker recognition process") of recognizing (estimating) the position or posture of the marker. That is, in the marker recognition process (step S202 of FIG. 12) to be described below, the feature point extraction process is performed on the input image to match the feature points of a portion of the marker image included in the input image with the feature points of a portion of the marker image included in a reference image prepared in advance. Since incorrect deviated values (outliers) may be included in a matching relation of the matched points in some cases, the deviated values are removed by applying a geometric constraint. By performing transformation from a reference image space to an input image space based on the matching relation in which the deviated values are removed, the position or posture of the marker is estimated.

However, some of the deviated values may not be removed in the geometric constraint. That is, when the coordinates of the feature point are matched with the coordinates of a feature point close to a proper matching point, no contradiction occurs in the geometric constraint, and thus some of the deviated values may not be removed. When the matching point is used to estimate the position or posture of the marker, the accuracy may deteriorate. Accordingly, one strategy for improving the accuracy of the estimation of the position or posture of the marker is to produce no outliers which may not be removed in the geometric constraint.

Accordingly, in an embodiment of the present technology, while the value of the feature amount of a feature point of interest does not approximate the values of the feature amounts of the feature points near the feature point of interest, a relation with the feature points other than the nearby feature points is not considered. This is because, as described above, in the feature points other than the nearby feature points, the deviated values may not be removed by the geometric constraints when the marker recognition process is performed. When the feature points other than the nearby feature points are considered, it is necessary to use more complicated feature amounts as the feature amounts so that the values of the feature amounts of the feature points are not approximated. However, as more complicated feature amounts are used, an amount of calculation at the time of the marker recognition process may increase. Thus, by setting only the feature points near the feature point of interest as comparison targets, the amount of calculation at the time of the marker recognition process may not be increased.

Next, the contents of a specific process of step S3 will be described.

Here, similarity between the feature amounts will be introduced. Feature amounts fi and fj are defined as in the following equation (1).

$$D(f_i, f_j) = \|f_i \wedge f_j\|_0 \quad (1)$$

Here, in Equation (1), $\|\ \|_0$ indicates L0 norm, and a number of elements which are not 0 among vector elements is given. Further, $\wedge$ assumes that a logical product (AND) is obtained with each vector element.

Here, when the marker image is processed, a process of processing the marker image can be comprehended as a problem for minimizing an evaluation function J of the following Equation (2) from the viewpoint of the fact that the original input image is reserved to some extent.

$$J(I') = \lambda \|I - I'\|_2 + \sum_{i=0}^{n-1} \sum_{j=0}^{n-1} \alpha(p_i, p_j) D(f_i(I'), f_j(I')) \quad (2)$$

Here, in Equation (2), λ is a parameter used to determine the degree of reservation of the original marker image. Further, α(pi, pj) is a function that attenuates as pi and pj are farther from each other and a configuration in which feature points other than the nearby feature points are not considered is realized by α. Further, I indicates a vector in which pixel values of the original marker image are arranged and I' indicates a vector in which pixel values of the processed marker image obtained by processing the original marker image are arranged.

That is, Equation (2) has a first term for evaluating preservation of the input image and a second term for evaluating loose condition of the feature amounts of the feature points. Since the first term is a term for causing the marker images before and after the process to be similar to some extent and the second term is a term for causing the nearby feature points on the marker image not to be similar, the first and second terms can be said to have a reciprocal relation.

Here, since I' for minimizing the evaluation function J is the marker image subjected to an optimum process, the image processing unit 14 minimizes the evaluation function J. Here, since the same pixel values as those of the original marker image are optimum solutions for pixels unrelated to the calculation of the feature amount in I', solutions of the pixels are fixed and minimization is performed, as shown in the following Equation (3).

$$I'[q] = I[q] \forall q \neq p_i \quad (3)$$

Here, in Equation (3), I[q] indicates a q element of the vector I.

When the coordinates of the feature amounts are not concentrated nearby, the minimization problem of the above-described evaluation function J is comprehended as a set of partial minimization problems and the evaluation function J is minimized according to a dynamic programming method. When the coordinates of the feature points become dense, the amount of calculation may not be reduced in spite of the fact that the minimization problem is comprehended as the partial minimization problem, and thus the amount of calculation becomes vast. In this case, the minimization of the evaluation function J is considered to be performed approximately and the minimization is performed using a simulated annealing method or an iterative conditional modes method.

When the marker image is processed in the process of step S3, the process proceeds to step S4.

In step S4, the feature point number and distribution determination unit 15 determines whether there is a bias in the distribution (positions) of the feature points on the processed marker image. When it is determined in step S4 that there is the bias in the distribution of the feature points, the process proceeds to step S5.

In step S5, the feature point generation unit 16 generates the feature points used to eliminate the bias of the distribution of the feature points on the marker image according to the determination result of the feature point number and distribution determination unit 15.

In step S6, the feature point generation unit 16 adds the feature points generated in step S5 to the processed marker image.

The addition of the feature points in step S6 is performed as follows.

That is, when the accuracy of a marker recognition process (step S202 of FIG. 12) to be described below is considered, the central position of the feature point on the marker image is preferably closer to the central position of the marker image. The first reason for this is that there is a probability of a bias occurring in the recognition result when there is the bias in the feature points. The second reason is that in consideration of the robustness when a part of the marker image is hidden, the fact that the number of matched points is considerably small rarely occurs when there is no bias in the arrangements of the feature points. For these reasons, when the central position of the feature point is close to the central position of the marker image, the accuracy of the recognition result is improved.

As the contents of the specific process of step S6, when the central positions of the coordinates of all of the feature points on the processed marker image are evaluated and the central positions of the coordinates of all of the feature points are far from the central position of the marker image by a value equal to or greater than a predetermined threshold value, the central positions of the feature points caused to approach the central position of the marker image by newly adding feature points. For example, the coordinates of the new feature point can be set to the coordinates at which a distance from another feature point is the maximum. As the method of processing the marker image, the pixel value at the coordinates of the new feature point is determined to have the maximum value or the minimum value (here, a value less changed from the original marker image is selected) so that the pixel value becomes the feature point. In consideration of the evaluation function J in Equation (2), the feature amounts are determined so as to satisfy the evaluation function J only near the coordinates of the new feature points.

The feature point generation unit 16 repeatedly adds the feature points until the central positions of the coordinates of all the feature points on the marker image are within the threshold value from the central position of the marker image.

When the feature positions are added in step S6 until the bias is eliminated in the distribution of the feature points on the marker image, the process proceeds to step S7. When it is determined in step S4 that there is no bias in the distribution of the feature points, step S5 and step S6 are skipped and the process proceeds to step S7.

In step S7, the feature point number and distribution determination unit 15 determines whether the number of feature points on the processed marker image is equal to or greater than a predetermined threshold value. When it is determined in step S7 that the number of feature points is less than the predetermined threshold value, the process proceeds to step S8.

In step S8, the feature point generation unit 16 generates feature points to increase the number of feature points on the marker image according to the determination result of the feature point number and distribution determination unit 15.

In step S9, the feature point generation unit 16 adds the feature points generated in step S8 to the processed marker image.

The addition of the feature points in step S9 is performed as follows.

That is, in the marker recognition process (step S202 of FIG. 12) to be described below, to suppress deterioration in estimation accuracy of the marker due to an influence of an error of the feature points, the influence of the error is reduced by performing a smoothing process using a plurality of matched points. Here, the smoothing process is performed on the assumption that there is no bias in a distribution as an error distribution. In an actual sample, the estimation accuracy of the marker depends on the number of matched points, since a distribution close to an assumed distribution can be obtained by increasing the number of matched points. Thus, the feature point generation unit 16 further processes the marker image by generating and adding the new feature points when the number of feature points is less than the predetermined threshold value.

When the number of feature points is added until the number of feature points on the marker image is equal to or greater than the predetermined threshold value in step S9, the process proceeds to step S10. When it is determined in step S7 that the number of feature points is equal to or greater than the predetermined threshold value, step S8 and step S9 are skipped and the process proceeds to step S10.

That is, through the above-described processes, the marker image is processed in the processes including at least the process of step S3 among the processes of step S3, step S6, and step S9.

In step S10, the marker image generation unit 17 generates a new marker image based on the marker image processed in the processes including at least the process of step S3.

The new marker image corresponds to the processed marker image. Since the feature points on the marker image are mutually loose on a feature space, the deviated values which may not be removed due to the geometric constraint are not included. Therefore, the feature points can be reliably matched using a reference image in the marker recognition process. Since the feature points are distributed uniformly in the new marker image, it is possible to suppress the influence of the error of the feature points when the position or posture of the marker is calculated. The marker images before and after the process are similar to each other to some extent. As a result, it is possible to calculate the position or posture of the marker for which the original state of an image, text, or the like desired by the user is preserved with high accuracy.

The marker image generated by the marker image generation unit 17 is output from the marker image output unit 18.

The first marker generation process has been described above.

<Specific Method of Processing Marker Image>

Next, a specific method of processing the marker image will be described with reference to FIGS. 4 to 7.

Figure 4:
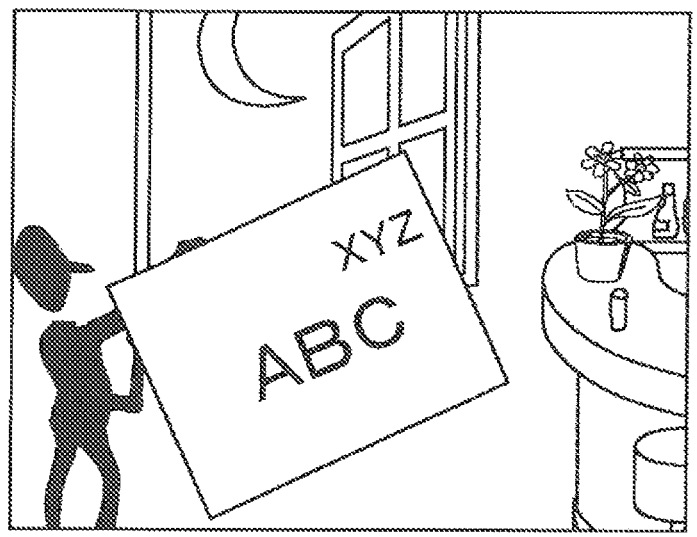
FIG. 4 is a diagram illustrating an input image.

FIG. 4 schematically illustrates the input image input to the image input unit 11. The input image is, for example, a captured image including a fillip on which the name of "ABC" company is recorded. The captured image includes a character string, "XYZ," in addition to the name of the company.

Figure 5:
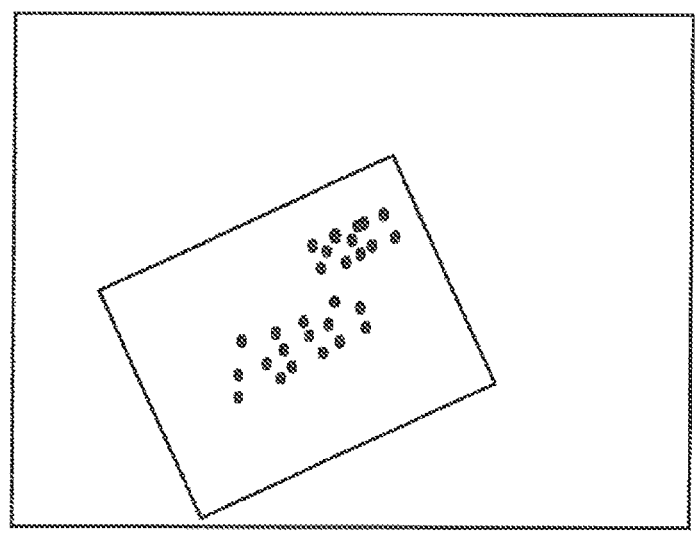
FIG. 5 is a diagram illustrating extraction and processing of feature points.

When the feature point extraction process (the process of step S1 in FIG. 3) is performed on the input image, as illustrated in FIG. 5, the feature points on the marker image are extracted. FIG. 5 is a diagram schematically illustrating the feature points on the marker image and black points in the drawing indicate the feature points. A feature amount is calculated for each of the feature points (the process of step S2 of FIG. 3) and a process is performed according to the feature amount of each feature point (the process of step S3 of FIG. 3). An example of the process includes a process of correcting luminance values of pixels corresponding to non-distinguishing feature points so that the feature points having similar feature amounts are not near each feature point on the marker image.

Figure 6:
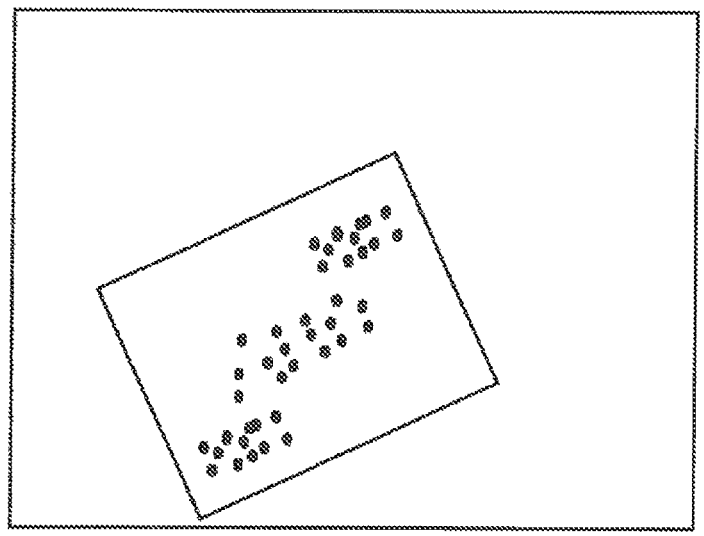
FIG. 6 is a diagram illustrating addition of feature points to eliminate a bias.

When there is the bias in the distribution of the feature points on the marker image, the processes (the processes of step S4 to step S6 of FIG. 3) of adding the feature points are performed so that the bias is eliminated in the distribution of the feature points, and thus the marker image in FIG. 6 can be obtained.

In this example, when the central positions of the coordinates of all of the feature positions on the marker image are compared with the central position of the marker image, the feature points obtained from a character string of "XYZ" are gathered in the upper right region of the marker image. However, the feature points are not present in the lower left region, and thus a state of imbalance occurs. Accordingly, by distributing the feature points in the lower left region of the marker image in the same arrangement of the feature points present in the upper right region, the central positions of the feature points approach the central position of the marker image.

Figure 7:
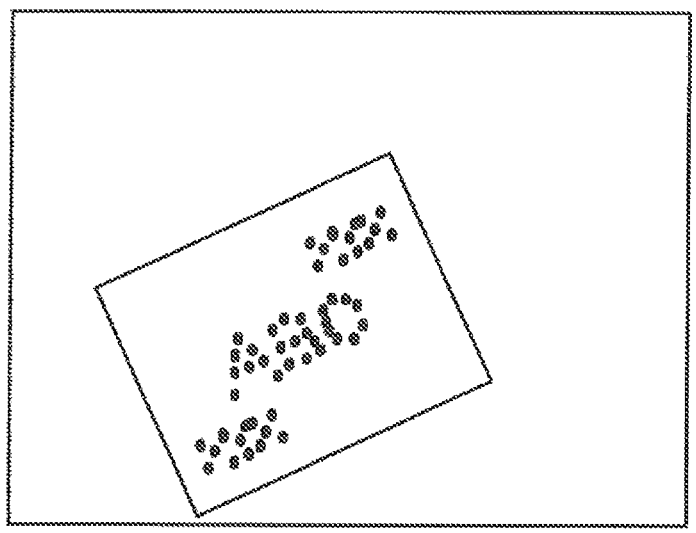
FIG. 7 is a diagram illustrating addition of feature points to increase the number of feature points.

When the number of feature points on the marker image is less than the predetermined threshold value, the process of adding the feature points (the processes of step S7 to step S9 of FIG. 3) is performed so that the number of feature points increases, thereby obtaining a marker image in FIG. 7.

In this example, the number of feature points on the marker image is less than the predetermined threshold value. Therefore, the new feature points are added at predetermined positions on the marker image so that the number of feature points exceeds the threshold value.

Thus, the new marker image is generated by processing the marker image. However, the new marker image in the state in which the original state of the character string such as "ABC" or "XYZ" is preserved is generated. As a result, it is possible to obtain the position or posture of the marker including the desired image or characters with high accuracy.

The specific method of processing the marker image has been described above.

<Second Embodiment>
<Example of Configuration of Image Processing Device>

Figure 8:
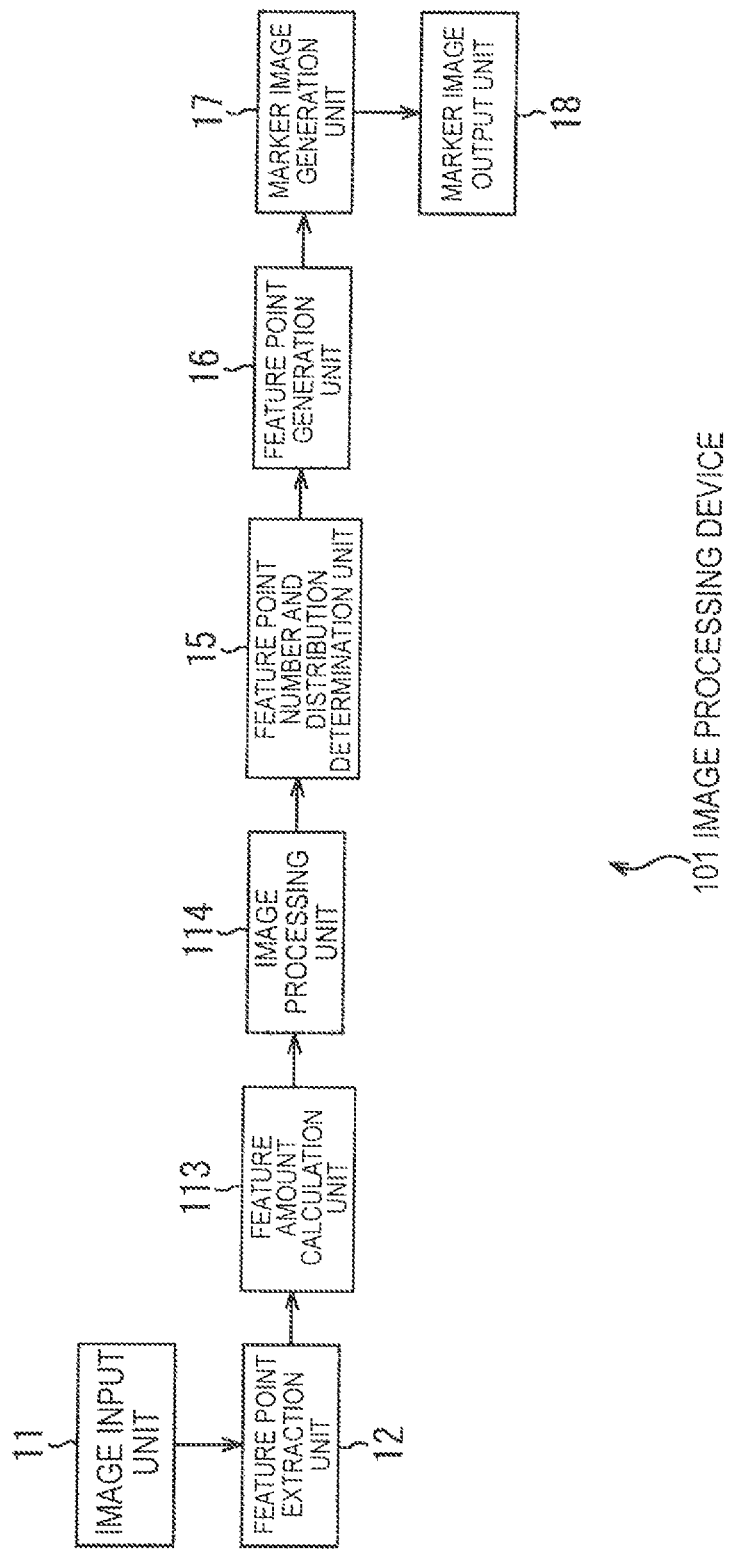
FIG. 8 is a diagram illustrating an embodiment of the configuration of an image processing device to which the present technology is applied.

FIG. 8 is a diagram illustrating an embodiment of the configuration of an image processing device to which the present technology is applied.

In the second embodiment, as described above, a marker image is generated considering the robustness against the direction of a marker or noise in a feature amount calculation process. Therefore, an image processing device 101 in FIG. 8 includes a feature amount calculation unit 113 and an image processing unit 114, instead of the feature amount calculation unit 13 and the image processing unit 14, compared to the image processing device 1 in FIG. 2.

The feature amount calculation unit 113 calculates a feature amount of each feature point extracted by the feature point extraction unit 12 and supplies the feature amount of each feature point to the image processing unit 114. However, the feature amount calculation unit 113 performs a feature amount calculation process using Random Ferns in consideration of the robustness.

The image processing unit 114 processes a marker image so that the feature points having similar feature amounts are not near each feature point on the marker image based on the feature amount of each feature point calculated by the feature amount calculation unit 113, and then supplies the processed marker image to the feature point number and distribution determination unit 15.

Since the image processing device 101 in FIG. 8 has the same configuration as the image processing device 1 in FIG. 2 except for the feature amount calculation unit 113 and the image processing unit 114, the description will be omitted.

The image processing device 101 has the above-described configuration.

<Second Marker Generation Process>

Next, a second marker generation process performed by the image processing device 101 in FIG. 8 will be described with reference to the flowchart of FIG. 9.

Figure 3:
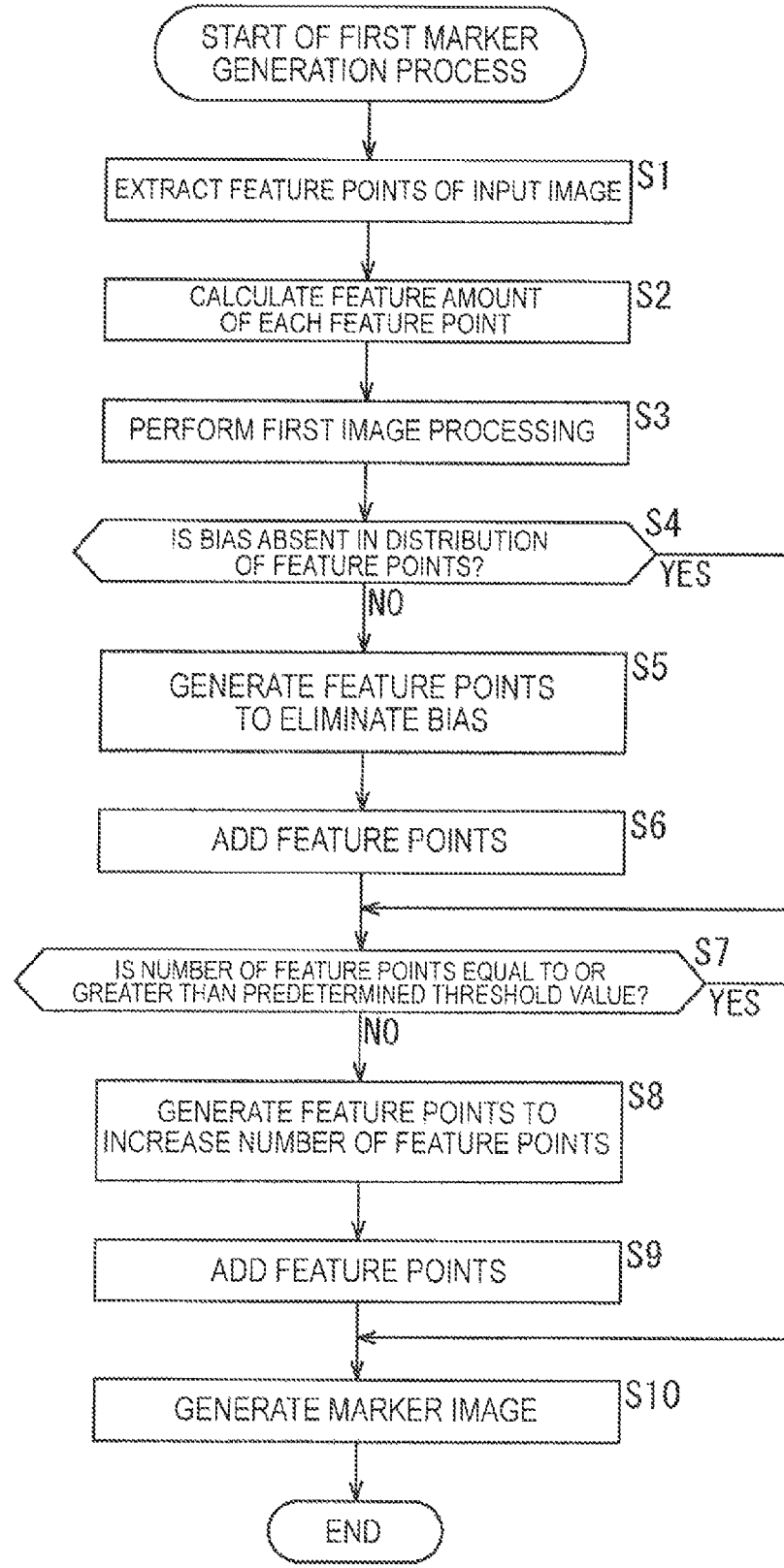
FIG. 3 is a flowchart for describing a first marker generation process.

In step S101, the feature point extraction unit 12 extracts the feature points from an input image, as in step S1 of FIG. 3.

In step S102, the feature amount calculation unit 113 performs the feature amount calculation process on each feature point extracted by the feature point extraction unit 12 using Random Ferns in consideration of the robustness to calculate a feature amount.

When the marker is oriented in various directions and noise is contained, there is a concern that marker recognition may not be performed accurately in a marker recognition process (step S202 of FIG. 12) to be described below. Therefore, it is necessary to perform a countermeasure with the feature amounts of the feature points. In Random Ferns in consideration of the robustness, recognition robust against the direction of the marker or the noise is performed by generating an image obtained by simulating the direction of the marker image or noise in advance, calculating the feature amounts using the image to make a dictionary, and using the dictionary in the marker recognition process.

Figure 10:
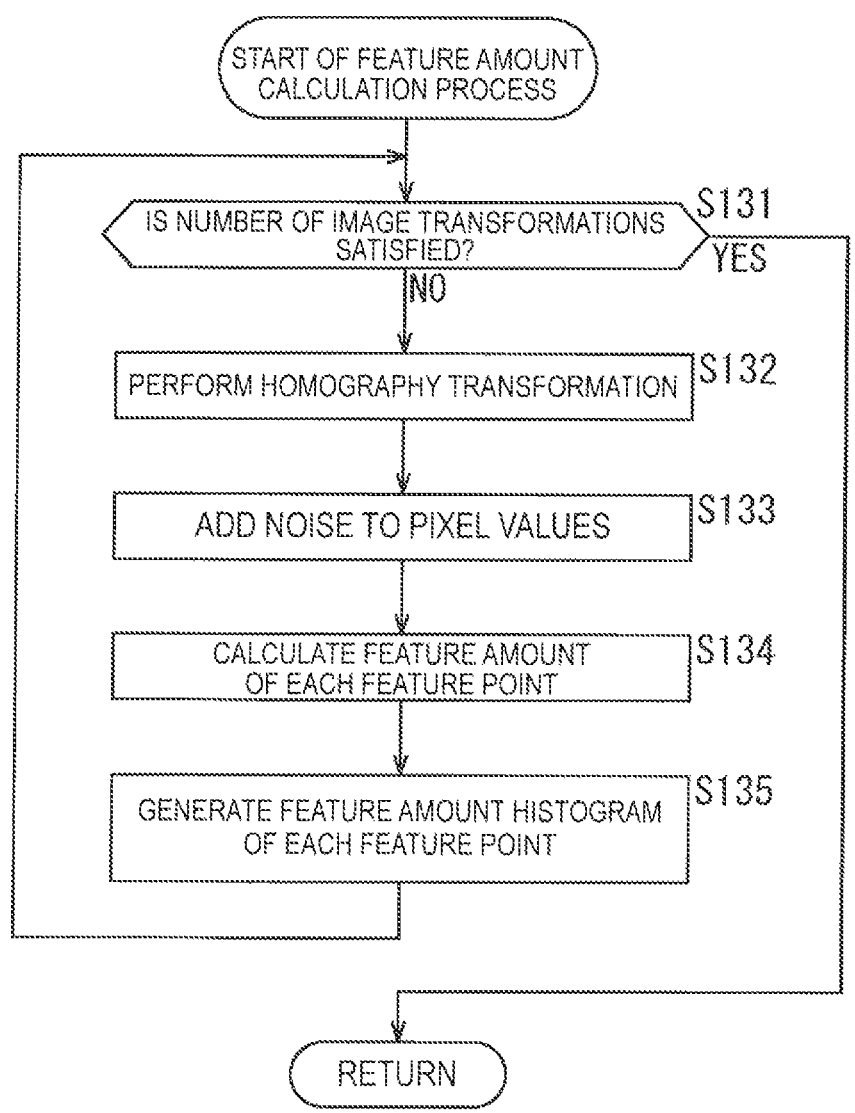
FIG. 10 is a flowchart for describing the details of a feature amount calculation process.

Here, the details of the feature amount calculation process using Random Ferns in consideration of the robustness will be described with reference to the flowchart of FIG. 10.

In step S131, the feature amount calculation unit 113 determines whether a predetermined number of image transformations is satisfied. When it is determined in step S131 that the number of image transformations is not satisfied, the process proceeds to step S132.

In step S132, the feature amount calculation unit 113 performs homography transformation on the input image. The homography transformation is performed using the following Equation (4).

$$\begin{bmatrix} w_i u_i \\ w_i v_i \\ w_i \end{bmatrix} = \begin{bmatrix} h_{00} & h_{01} & h_{02} \\ h_{10} & h_{11} & h_{12} \\ h_{20} & h_{21} & h_{22} \end{bmatrix} \begin{bmatrix} x_i \\ y_i \\ 1 \end{bmatrix} \quad (4)$$

In Equation (4), it is assumed that (x, y) represents the coordinates of the input image, (u, v) represents coordinates after the transformation, and $(w_i u_i, w_i v_i, w_i)$ represents homogeneous coordinates of (u, v). Through the transformation, various directions of the marker can be simulated. However, upper limit values in the directions of the marker are set and parameters of the homography transformation are assumed to be generated at random among them. Here, the example in which the homography transformation is used as the geometric transformation has been described, but another transformation method can be used.

In step S133, the feature amount calculation unit 113 adds noise to the pixel values of pixels constituting the input image after the homography transformation. The amount of noise is added according to a normal distribution.

In step S134, the feature amount calculation unit 113 calculates the feature amount of each feature point. Here, as in step S2 of FIG. 3, a bit string can be obtained as a feature amount by describing a magnitude relation between two points selected at random in a periphery of a pixel of interest in binary (0, 1) and performing this operation a plurality of times.

In step S135, the feature amount calculation unit 113 generates a histogram (hereinafter referred to as a "feature amount histogram") corresponding to the feature amount of each feature point. Here, a histogram H in which the number of elements is the number of values which the feature amount fi has is generated and added to a binary histogram corresponding to the obtained feature amount.

When the process of step S135 ends, the process returns to step S131, and then step S132 to step S135 described above are repeated until the number of image transformations reaches the predetermined number of image transformations.

Figure 9:
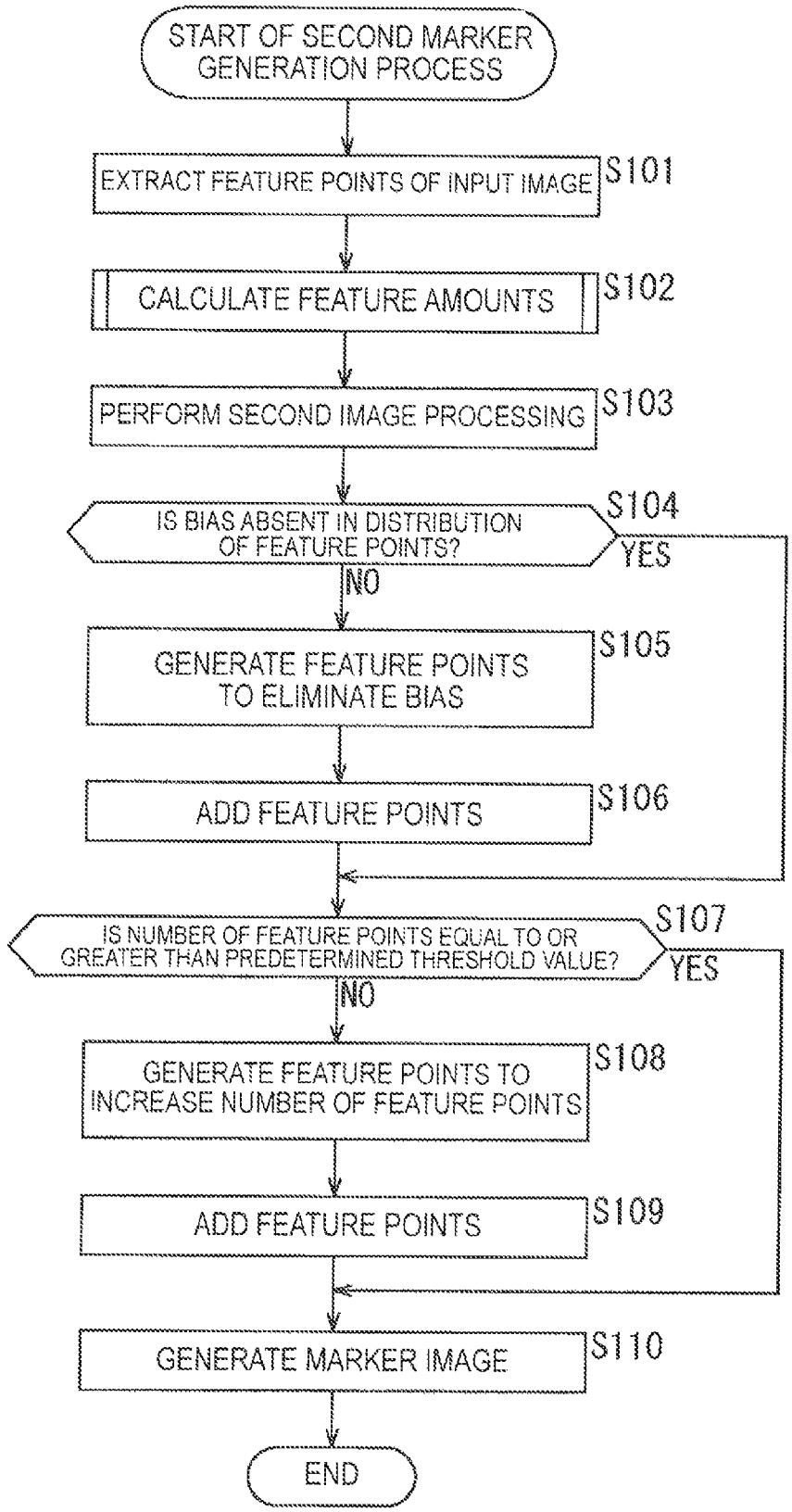
FIG. 9 is a flowchart for describing a second marker generation process.

When it is determined in step S131 that the predetermined number of image transformations is satisfied, the process returns to step S102 of FIG. 9 and subsequent processes are performed.

In step S103, the image processing unit 114 performs second image processing.

In the second image processing, the marker image is processed so that the feature points having similar feature amounts are not near each feature point on the marker image. Thus, the non-distinguishing feature points are processed among the feature points on the marker image, and thus the feature amounts of the non-distinguishing feature points are transformed into the feature amounts of the distinguishing feature points.

In the second image processing, however, the process of processing the marker image is performed on each feature amount fi obtained through the feature amount calculation process of step S102 so that a combination in which a distance on the feature space between the feature amount histograms is close is eliminated.

The contents of a specific process of step S103 will be described.

Here, similarity between the feature amounts will be introduced. Feature amount histograms Hi and Hj are defined as in the following equation (5).

$$D_H(H_i, H_j) = \sum_{k=0}^{K} \sqrt{H_i(k) H_j(k)} \quad (5)$$

When the marker image is processed, the process of processing the marker image can be comprehended as a problem of minimizing an evaluation function J of the following Equation (6) from the viewpoint of the fact that the original input image is reserved to some extent.

$$J(I') = \lambda\|I - I'\|_2 + \sum_{i=0}^{n-1}\sum_{j=0}^{n-1} \alpha(p_i, p_j) D_H(H_i(I'), H_j(I')) \quad (6)$$

Here, in Equation (6), as in the foregoing Equation (2), $\lambda$ is a parameter used to determine a reservation state of the original marker image, $\alpha(pi, pj)$ is an attenuation function, I indicates a vector in which pixel values of the original marker image are arranged, and I' indicates a vector in which pixel values of the processed marker image are arranged.

That is, as in the foregoing Equation (2), Equation (6) has a first term for evaluating preservation of the input image and a second term for evaluating loose condition of the feature amounts of the feature points. The first and second terms have a reciprocal relation.

Here, since I' for minimizing the evaluation function J is the marker image subjected to an optimum process, the image processing unit 114 minimizes the evaluation function J. Here, in I', since the same pixel values as those of the original marker image are optimum solutions for pixels unrelated to the calculation of the feature amount, solutions of the pixels are fixed to be minimized, as shown in the following Equation (7).

$$I'[q] = I[q] \forall q \neq p_i \quad (7)$$

Here, in Equation (7), I[q] indicates a q element of the vector I, as in Equation (3).

As in the first embodiment, when the coordinates of the feature amounts are not concentrated nearby, the minimization problem of the above-described evaluation function J is comprehended as a set of partial minimization problems and the evaluation function J is minimized according to a dynamic programming method. When the coordinates of the feature points become dense, the amount of calculation may not be reduced in spite of the fact that the minimization problem is comprehended as the partial minimization problem, and thus the amount of calculation becomes vast. In this case, the minimization of the evaluation function J is considered to be performed approximately and the minimization is performed using a simulated annealing method or an iterative conditional modes method.

When the evaluation function I is minimized, it is necessary to calculate the value of DH for each sequential process. Therefore, the homography transformation performed in step S132 of FIG. 10 is performed also on I', the feature amount histogram H is obtained, and DH is calculated. At this time, it is not necessary to perform the calculation on the entire image again. The amount of calculation can be reduced by considering a difference between minimization steps t and t+1.

That is, when "$\Delta I = I'(t+1) - I'(t)$" is defined, the value of a bin of the histogram corresponding to the feature amount obtained from only the pixels satisfying "$\Delta I = 0$" is "$H(I'(t+1)) = H(I'(t))$." Therefore, the calculation of the histogram may be performed only on the pixels which do not satisfy "$\Delta I = 0$" using the value of the minimization step t without change. Here, although I and I' have meant the images in the above description, in this paragraph it has been assumed that I and I' mean the pixels.

When the marker image is processed in the process of step S103, the process proceeds to step S104.

In step S104 to step S106, when there is a bias in the distribution of the feature points on the marker image, the feature points are added so that the bias is eliminated in the distribution of the feature points, as in step S4 to step S6 of FIG. 3.

In step S107 to step S109, when the number of feature points on the marker image is less than the predetermined threshold value, the feature points are added so that the number of feature points increases, as in step S7 to step S9 of FIG. 3.

In step S110, the marker image generation unit 17 generates a new marker image, as in step S10 of FIG. 3.

The second marker generation process has been described.

<Third Embodiment>
<Example of Configuration of Image Processing Device>

Figure 11:
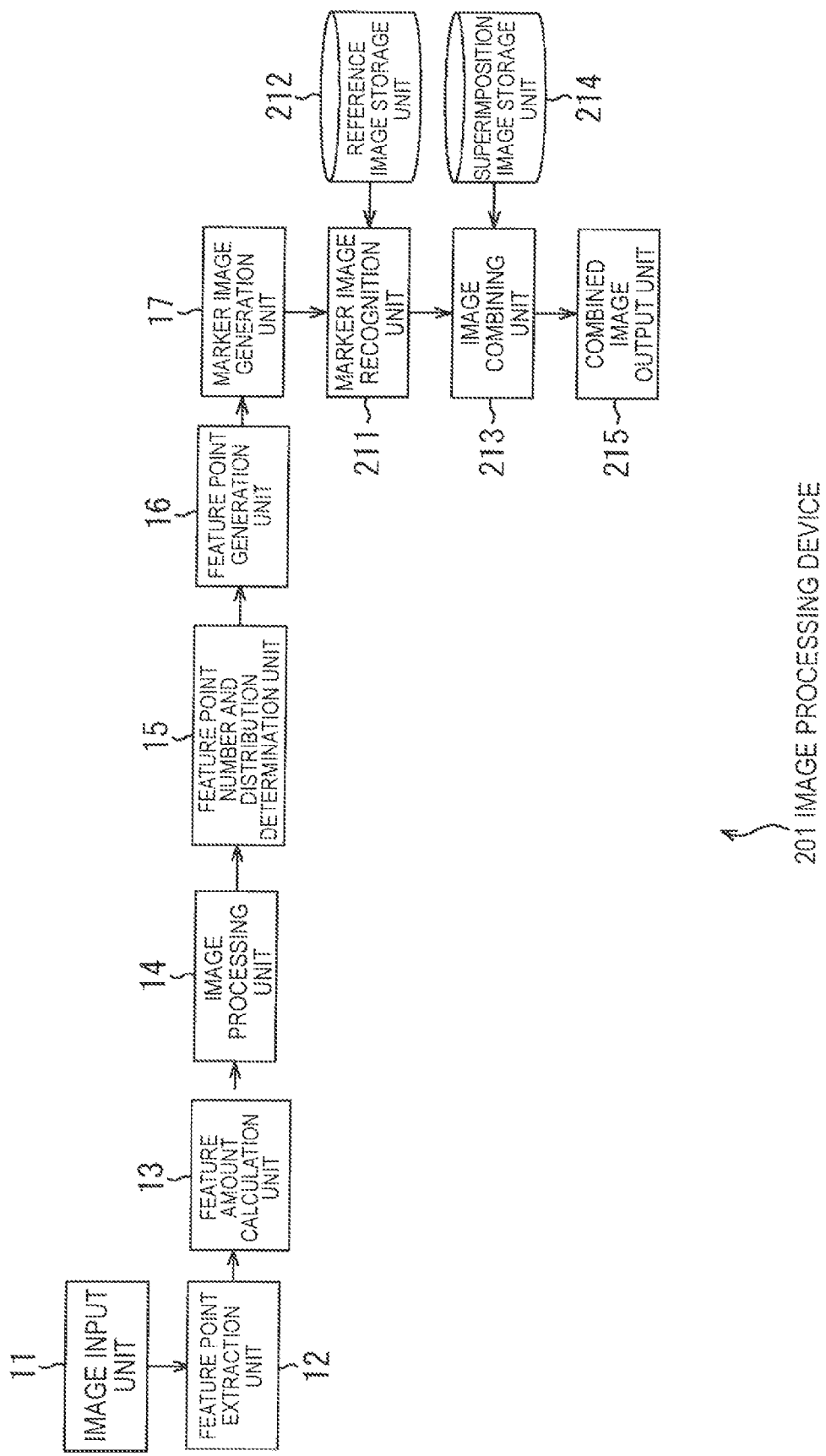
FIG. 11 is a diagram illustrating an embodiment of the configuration of an image processing device to which the present technology is applied.

FIG. 11 is a diagram illustrating an embodiment of the configuration of an image processing device to which the present technology is applied.

An image processing device 201 in FIG. 11 generates a combined image by combining a superimposition image on a marker image included in an input image. Therefore, the image processing device 201 includes a marker image recognition unit 211, a reference image storage unit 212, an image combining unit 213, a superimposition image storage unit 214, and a combined image output unit 215, instead of the marker image output unit 18, compared to the image processing device 1 in FIG. 2.

The image input unit 11 to the marker image generation unit 17 process the marker image included in the input image to generate a new marker image, as described above. The input image including the new marker image is supplied to the marker image recognition unit 211.

When the input image is supplied from the marker image generation unit 17, the marker image recognition unit 211 recognizes the new marker image included in the input image based on a reference image stored in the reference image storage unit 212 and supplies the recognition result to the image combining unit 213.

The image combining unit 213 combines the superimposition image stored in the superimposition image storage unit 214 with the new marker image included in the input image according to the recognition result from the marker image recognition unit 211 and supplies the combined image to the combined image output unit 215.

The combined image output unit 215 outputs the combined image supplied from the image combining unit 213 to an external device.

The image processing device 201 has the above-described configuration.

<Combined Image Generation Process>

Figure 12:
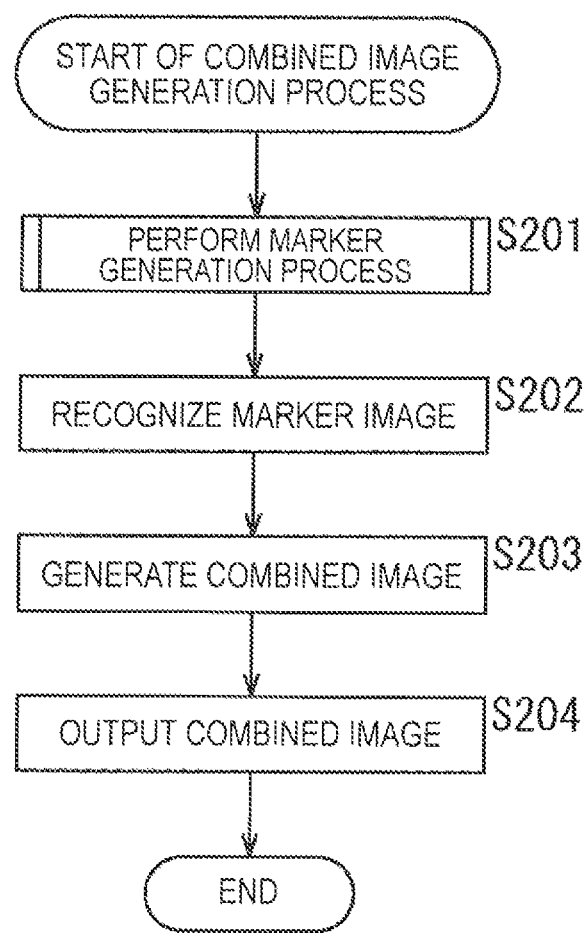
FIG. 12 is a flowchart for describing a combined image generation process.

Next, the combined image generation process performed by the image processing device 201 in FIG. 11 will be described with reference to the flowchart of FIG. 12.

In step S201, the feature point extraction unit 12 to the marker image generation unit 17 perform the first marker image generation process in FIG. 3 to generate the new marker image.

In step S202, the marker image recognition unit 211 performs a marker recognition process to recognize the new marker image included in the input image.

In the marker recognition process, the feature point extraction process is performed on the input image to match the feature points of a portion of the marker image included in the input image with the feature points of a portion of the marker image included in the reference image read from the reference image storage unit 212. At this time, the geometric constraint is performed to eliminate the deviated values. However, in the new marker image, the feature points on the marker image are mutually loose on the feature space through the above-described first image processing (step S3 of FIG. 3), and thus the deviated values which may not be removed due to the geometric constraint are not included. Therefore, the feature points can be reliably matched using the reference image. Further, not all of the feature points on the marker image are compared with the feature point of interest, but only the feature points near the feature point of interest are compared, so that the feature amounts of the non-distinguishing feature points are transformed into the feature amounts of the distinguishing feature points. Therefore, the number of transformations can be reduced. As a result, even when the number of feature points increases, it is not necessary to complicate the feature amounts. Thus, the amount of calculation at the time of the marker recognition process can be reduced.

When the bias is eliminated in the distribution of the feature points on the marker image in step S4 to step S6 of FIG. 3 described above, a deviation rarely occurs in the recognition result. Further, a case in which the number of matched points considerably decreases rarely occurs. Therefore, the accuracy of the marker recognition process can be improved. By uniformly distributing the feature points on the marker image, it is possible suppress the influence of the error of the feature points at the time of the calculation of the position or posture of the marker.

When the number of feature points on the marker image increases to be equal to or greater than the predetermined threshold value in step S7 to step S9 of FIG. 3 described above, a distribution close to a distribution assumed at the time of the smoothing process can be obtained. Therefore, the influence of the error of the feature points can be reduced, and thus it is possible suppress deterioration in the estimation accuracy of the marker. That is, the estimation accuracy of the marker and the number of feature points on the marker image have a given relation, and thus the estimation accuracy is better with an increase in the number of feature points. Therefore, by increasing the number of feature points, it is possible to calculate the position or posture of the marker with high accuracy.

When the marker image is recognized in the process of step S202, the process proceeds to step S203.

In step S203, the image combining unit 213 generates a combined image by combining the superimposition image read from the superimposition image storage unit 214 with a region of the marker image included in the input image according to the recognition result from the marker image recognition unit 211.

In step S204, the combined image output unit 215 outputs the combined image generated by the image combining unit 213.

The combined image generation process has been described above.

<Specific Method of Generating Combined Image>

Next, a specific method of generating the combined image will be described with reference to FIG. 13.

FIG. 13 is a diagram schematically illustrating an input image and a combined image. The input image on the left side of FIG. 13 is a captured image including a fillip on which the name of "ABC" company is recorded, as in the above-described example. The captured image includes a character string, "XYZ," in addition to the name of the company.

When the marker generation process (step S201 of FIG. 12) is performed on the input image, the marker image is processed and a marker image is newly generated.

When the marker recognition process (step S202 of FIG. 12) is performed on the input image, the newly generated marker image is recognized from the captured image. Then, the image combining process (step S203 of FIG. 12) of superimposing the superimposition image such as a graph indicating sales of the company on the region of the marker image recognized through the marker recognition process is performed, so that the combined image on the right side of FIG. 13 can be obtained.

The specific method of generating the combined image has been described above.

In the third embodiment, the marker generation process at the time of the application of the feature amount calculation process in which Random Ferns without consideration of the robustness is not used has been described, as in the first embodiment. However, the feature amount calculation process using Random Ferns in consideration of the robustness may be applied as in the second embodiment. In this case, in the process of step S201 of FIG. 12, the second marker generation process in FIG. 9 is called and performed.

As described above, according to an embodiment of the present technology, an image, text, or the like desired by a user is configured to be included in a marker image, so that the position or posture of a marker in the state in which the original image, text, or the like is maintained as much as possible is calculated with high accuracy.

According to an application program, any of various images may be desired to be used as markers in some cases. For example, when a magazine is recognized and predetermined information is superimposed, the cover sheet of the magazine is recognized as a marker, but there are various cover sheets of the magazine. Further, the markers include not only a marker which is easy to recognize but also a marker which is difficult to recognize. This depends on whether the marker is a marker which is easy to recognize from the marker recognition process. For example, an example of the marker which is difficult to recognize includes the logo of the company described above. When the logo of the company is used as a marker, the following problems may occur. That is, when many repetition patterns such as characters are included, there is a problem that a probability of error occurrence is high when a matching relation of the feature points of a reference image is obtained at the time of the marker recognition process. Further, when design is simple as in the logo of the company, the number of basically extracted feature points is small. Therefore, there is a problem that the position or direction of a marker may not be estimated reliably.

In an embodiment of the present technology, in order to resolve the problems, the marker image which is easy to recognize is configured to be generated while the original image information is maintained to some extent by processing (correcting) the original marker image. As a result, for example, even when a marker such as a cover sheet of a magazine or the logo of the company is difficult to recognize, the position or posture of the marker can be recognized with high accuracy.

<Description on Computer to which Present Technology is Applied>

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

Figure 14:
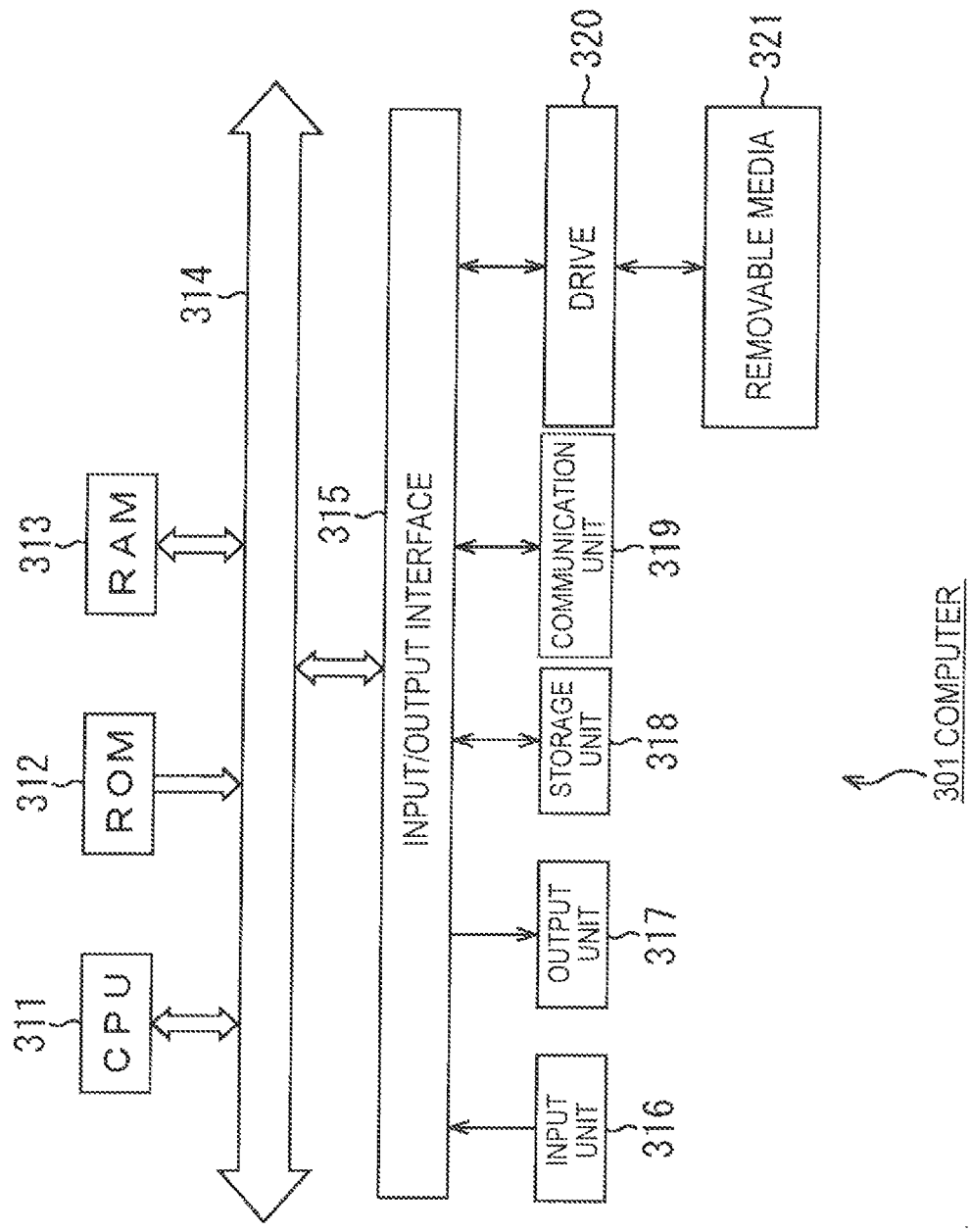
FIG. 14 is a diagram illustrating an example of the configuration of a computer.

FIG. 14 is a block diagram showing a hardware configuration example of a computer that performs the above-described series of processing using a program.

In the computer 301, a central processing unit (CPU) 311, a read only memory (ROM) 312 and a random access memory (RAM) 313 are mutually connected by a bus 314.

An input/output interface 315 is also connected to the bus 314. An input unit 316, an output unit 317, a storage unit 318, a communication unit 319, and a drive 320 are connected to the input/output interface 315.

The input unit 316 is configured from a keyboard, a mouse, a microphone or the like. The output unit 317 is configured from a display, a speaker or the like. The storage unit 318 is configured from a hard disk, a non-volatile memory or the like. The communication unit 319 is configured from a network interface or the like. The drive 320 drives a removable media 321 such as a magnetic disk, an optical disk, a magneto-optical disk, a semiconductor memory or the like.

In the computer 301 configured as described above, the CPU 311 loads a program that is stored, for example, in the storage unit 318 onto the RAM 313 via the input/output interface 315 and the bus 314, and executes the program. Thus, the above-described series of processing is performed.

Programs to be executed by the computer 301 (the CPU 311) are provided being recorded in the removable media 321 which is a packaged media or the like. Also, programs may be provided via a wired or wireless transmission medium, such as a local area network, the Internet or digital satellite broadcasting.

In the computer 301, by loading the removable medium 321 into the drive 320, the program can be installed into the storage unit 318 via the input/output interface 315. It is also possible to receive the program from a wired or wireless transfer medium using the communication unit 319 and install the program into the storage unit 416. As another alternative, the program can be installed in advance into the ROM 312 or the storage unit 318.

It should be noted that the program executed by a computer may be a program that is processed in time series according to the sequence described in this specification or a program that is processed in parallel or at necessary timing such as upon calling.

Here, in the present specification, processing steps that describe the program causing the computer 301 to execute various processes may not necessarily be processed in time series in the order prescribed as a flowchart, but include processes (for example, parallel processes or processes by objects) performed in parallel or individually.

The program may be a program executed by a single computer or may be a program executed in a distribution manner by a plurality of computers. The program may be transmitted remotely to a computer to be executed.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

The embodiment of the present technology is not limited to the above-described embodiment. It should be understood by those skilled in the art that various modifications, combinations, sub-combinations and alterations may occur depending on design requirements and other factors insofar as they are within the scope of the appended claims or the equivalents thereof.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Additionally, the present technology may also be configured as below.

(1) An image processing device including:
 a feature point extraction unit that extracts feature points from an input image;
 a feature amount calculation unit that calculates feature amounts of the feature points;
 an image processing unit that processes the marker image to transform the feature amounts of non-distinguishing feature points into feature amounts of distinguishing feature points when the feature points extracted from a marker image included in the input image are not distinguishing; and
 a marker image generation unit that generates a new marker image based on the processing result.

(2) The image processing device according to (1), wherein the image processing unit processes the marker image so that a value of the feature amount of a feature point of interest which is a feature point in which interest is taken does not approximate values of the feature amounts of the feature points near the feature point of interest.

(3) The image processing device according to (1) or (2), further including:
 a feature point generation unit that generates feature points to be added to the processed marker image and adds the generated feature points to the processed marker image.

(4) The image processing device according to (3), wherein the feature point generation unit adds the feature points so that a bias is eliminated in a distribution of the feature points when there is the bias in the distribution of the feature points on the marker image.

(5) The image processing device according to (3) or (4), wherein the feature point generation unit adds the feature points so that a number of the feature points increases when the number of the feature points on the marker image is less than a predetermined threshold value.

(6) The image processing device according to any one of (1) to (5), wherein the image processing unit processes the marker image so that an evaluation function that has a term for evaluating preservation of the input image and a term for evaluating loose condition of the feature amounts of the feature points is minimized.

(7) The image processing device according to any one of (1) to (6), wherein the feature amount calculation unit calculates the feature amounts in consideration of robustness of information regarding the marker image or without consideration of the robustness of the information regarding the marker image.

(8) The image processing device according to any one of (1) to (7), further including:
 a recognition unit that recognizes a new marker image used for image combining and included in the input image; and
 an image combining unit that combines a predetermined superimposition image on the recognized marker image.

(9) The image processing device according to any one of (1) to (8), wherein the image processing unit corrects a luminance value of a pixel corresponding to the non-distinguishing feature point.

(10) An image processing method in an image processing device, including: by the image processing device,
 extracting feature points from an input image;

calculating feature amounts of the feature points;

processing the marker image to transform the feature amounts of non-distinguishing feature points into feature amounts of distinguishing feature points when the feature points extracted from a marker image included in the input image are not distinguishing; and generating a new marker image based on the processing result.

(11) A program for causing a computer to function as:

a feature point extraction unit that extracts feature points from an input image;

a feature amount calculation unit that calculates feature amounts of the feature points;

an image processing unit that processes the marker image to transform the feature amounts of non-distinguishing feature points into feature amounts of distinguishing feature points when the feature points extracted from a marker image included in the input image are not distinguishing; and a marker image generation unit that generates a new marker image based on the processing result.

What is claimed is:

1. An image processing device comprising:
    a feature point extraction unit that extracts feature points from a marker image included in an input image;
    a feature amount calculation unit that calculates feature amounts of the feature points;
    an image processing unit that processes the marker image to transform the feature amounts of non-distinguishing feature points into feature amounts of distinguishing feature points when the feature points extracted from the marker image are not distinguishing, so that a value of the feature amount of a feature point of interest which is a feature point in which interest is taken does not approximate values of the feature amounts of the feature points near the feature point of interest; and
    a marker image generation unit that generates a new marker image based on the processing result.

2. The image processing device according to claim 1, further comprising:
    a feature point generation unit that generates feature points to be added to the processed marker image and adds the generated feature points to the processed marker image.

3. The image processing device according to claim 2, wherein the feature point generation unit adds the feature points so that a bias is eliminated in a distribution of the feature points when there is the bias in the distribution of the feature points on the marker image.

4. The image processing device according to claim 2, wherein the feature point generation unit adds the feature points so that a number of the feature points increases when the number of the feature points on the marker image is less than a predetermined threshold value.

5. The image processing device according to claim 1, wherein the image processing unit processes the marker image so that an evaluation function that has a term for evaluating preservation of the input image and a term for evaluating loose condition of the feature amounts of the feature points is minimized.

6. The image processing device according to claim 1, wherein the feature amount calculation unit calculates the feature amounts in consideration of robustness of information regarding the marker image or without consideration of the robustness of the information regarding the marker image.

7. The image processing device according to claim 1, further comprising:
    a recognition unit that recognizes a new marker image used for image combining and included in the input image; and
    an image combining unit that combines a predetermined superimposition image on the recognized marker image.

8. The image processing device according to claim 1, wherein the image processing unit corrects a luminance value of a pixel corresponding to the non-distinguishing feature point.

9. An image processing method in an image processing device, comprising: by the image processing device,
    extracting feature points from a marker image included in an input image;
    calculating feature amounts of the feature points;
    processing the marker image to transform the feature amounts of non-distinguishing feature points into feature amounts of distinguishing feature points when the feature points extracted from the marker image included in the input image are not distinguishing, so that a value of the feature amount of a feature point of interest which is a feature point in which interest is taken does not approximate values of the feature amounts of the feature points near the feature point of interest; and
    generating a new marker image based on the processing result.

10. A non-transitory computer-readable medium on which is recorded a program for causing a computer to function as:
    a feature point extraction unit that extracts feature points from a marker image included in an input image;
    a feature amount calculation unit that calculates feature amounts of the feature points;
    an image processing unit that processes the marker image to transform the feature amounts of non-distinguishing feature points into feature amounts of distinguishing feature points when the feature points extracted from the marker image included in the input image are not distinguishing, so that a value of the feature amount of a feature point of interest which is a feature point in which interest is taken does not approximate values of the feature amounts of the feature points near the feature point of interest; and
    a marker image generation unit that generates a new marker image based on the processing result.

* * * * *